United States Patent Office 2,960,526
Patented Nov. 15, 1960

2,960,526

PEROXY PHOSPHATE ESTERS

James B. Harrison, Eggertsville, and Orville L. Mageli, Grand Island, N.Y., assignors to Wallace & Tiernan Incorporated, Newark, N.J.

No Drawing. Filed July 21, 1958, Ser. No. 749,589

17 Claims. (Cl. 260—461)

The present invention relates to peroxy esters and particularly to peroxy phosphate esters.

The peroxy phosphate esters of the present invention are either liquid or solid products depending upon their molecular weight and upon the various organic residues combined in the phosphate ester.

The peroxy phosphate esters of the present invention are easily and readily prepared in good yield by reacting a chlorophosphate with a hydroperoxide. This chemical reaction is generally performed in an alkaline medium and at a temperature not so high as to induce decomposition of the wanted end product or of the reactants themselves. In general, the reaction will proceed smoothly at room temperature.

The alkalies normally employed are the alkali metal hydroxides such as lithium hydroxide, sodium hydroxide, cesium hydroxide and particularly potassium hydroxide, by reason of generally better solubility characteristics of the potassium salts. Under some circumstances it will be found advisable to employ an organic alkali, as for instance pyridine or other N-heterocyclic carbon ring compound such as piperidine, quinoline, isoquinoline and the picolines and other alkyl derivatives of pyridine as well as other alkaline materials such as ammonia and the organic amines as for instance the lower alkyl amines.

The broad concept of the reaction may be illustrated by the following equation:

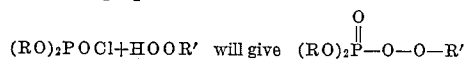

or, more broadly

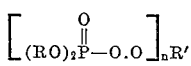

where R and R' are each an organic radical selected from the group consisting of aliphatic straight chain radicals, aliphatic branched chain radicals, carbocyclic radicals, aralkyl radicals, and $n$ is an integer less than 3.

The reaction proceeds between molar amounts of hydroperoxide and phosphate halide and a slight excess of one or the other may be employed to insure substantial completion of the reaction, the choice often being dictated by the ease with which such excess can be removed from the final wanted product. Due to the fact that the hydroperoxides can be decomposed to an organic hydroxy compound it will generally be better to employ the excess of the hydroperoxide except in those instances where the hydrolysis product of the phosphate halide is soluble in water or mild alkali and may be readily washed out and the wanted product thus purified.

The aliphatic straight chain radicals will, in general, contain less than 23 carbon atoms, some examples being butyl, octyl, stearyl and the like, while the aliphatic branched chain radicals will contain not more than 18 carbons in each branched chain although in many instances a somewhat lesser number of carbons will be found to be present, as for instance the tertiary butyl, dimethylhexyl and the like, while the carbocyclic radicals are the carbopentyl and carbohexyl, that is, those carbocyclic radicals of less than 7 carbons. The aralkyl, as for instance the cumyl, should contain less than 18 carbon atoms.

The end product, the peroxy phosphate ester, has a variety of uses (1) depending upon free radical formation and therefore as a polymerization catalyst and (2) depending upon its oxidizing capacity, as for instance as a bleaching agent for a variety of edible materials, flour being an illustrative example.

The following examples are given as illustrative of the invention and not as limitative thereof.

EXAMPLE 1

*Di-n-butyl peroxy-t-butyl phosphate*

The potassium salt of the hydroperoxide in solution was prepared by adding 5.16 g. (0.056 mole) of 98% t-butyl hydroperoxide to a cold 20% aqueous solution of potassium hydroxide (which had been prepared 7.72 g. of 45% potassium hydroxide and 9.2 g. of chipped ice). To this "K" salt, 11.44 g. (0.05 mole) of dibutyl chlorophosphate was added, dropwise, over about a seven minute period. Rapid stirring was maintained and the temperature was controlled at 20° C. to 24° C. by intermittent cooling. For the remainder of a one hour reaction period, the temperature was controlled between 20° C. and 26° C. At the end of the reaction period, the mixture was diluted with 20 ml. of cold water and extracted with 50 ml. of petroleum ether (30° to 60° fraction). The organic phase was then washed twice with 30 ml. portions of cold water. The second wash was neutral. The organic phase was dried over anhydrous magnesium sulfate. Filtration and removal of the solvent under reduced pressure (15 to 20 mm.) left 13.0 g. of colorless oil, which was then pumped for two hours at less than 1 mm. pressure. After pumping 12.5 g. (88.6% of theory) of oil remained; $d_4^{25}$, 0.9939; $n_D^{25}$, 1.4248. Assay for active oxygen=5.60% as against 5.65 calculated (99% of theory). Molecular refraction—Calculated, 71.82; observed, 72.60 (see G. Kosolapoff, Organophosphorus Compounds, p. 7).

Calculated for $C_{12}H_{27}O_5P$: C, 51.05; H, 9.64; P, 10.97. Found: C, 50.28; H, 9.20; P, 10.76.

EXAMPLE 2

*Di-n-octyl peroxy-t-butyl phosphate*

To the solution of the potassium salt of t-butyl hydroperoxide prepared by adding 18.4 g. of 98% t-butyl hydroperoxide (0.20 mole) to 34.1 g. of ice and 27.4 g. of 45% potassium hydroxide was added 34.0 g. (0.1 mole) of di-n-octyl chlorophosphate. The mixture was rapidly stirred during the addition and after, for a total time of 3.5 hours. The reaction temperature was maintained between 20° C. and 30° C. by intermittent cooling. The product was extracted with petroleum ether (B.P. 30 to 60° C.). The ether solution was washed to remove impurities. The solution was dried over anhydrous magnesium sulfate, filtered and the solvent removed under reduced pressure to leave 31 g. (78.7% yield) of an oil; $n_D^{25}$ 1.4380, $d_4^{25}$ 0.9484.

Calculated for $C_{20}H_{43}O_5P$: C, 60.88; H, 10.99; P, 7.85; Act. (O) 4.06. Found: C, 60.74; H, 10.74; P, 8.08; Act. (O) 4.02.

Molecular refraction: Calculated, 108.8; observed, 109.2.

EXAMPLE 3

*Di-n-butyl peroxy-pinanyl phosphate*

To a solution of 3.78 g. of 90% pinane hydroperoxide (0.02 mole) in 50 ml. of petroleum ether (30 to 60° fraction) and 3.16 g. (0.04 mole) of pyridine, 4.57 g. (0.02 mole) of dibutyl chlorophosphate was added at room temperature in one portion with rapid stirring. The temperature of the solution was at 19° C. to 20° C. at the start and the mixture was stirred at room temperature for three hours. No cooling was necessary. Another volume of petroleum ether was added at the end of the reaction period and the mixture was filtered to remove pyridine hydrochloride. The petroleum ether solution was then washed three times with 30 ml. portions of cold water, once with 10 ml. of saturated tartaric acid solution, once with 20 ml. of cold water, once with 10 ml. of 10% sodium bicarbonate solution and twice with cold water (20 and 10 ml.). Drying of the organic phase with anhydrous magnesium sulfate, filtration and removal of the solvent under reduced pressure (down to about 0.1 mm.) left 7.1 g. (98% of theory) of colorless oil; $d_4^{25}$, 1.0371; $n_D^{25}$, 1.4577. Assay=4.00% Act. (O); calculated 4.41% (90.6% of theory).

Molecular refraction: Calculated, 95.62; observed, 95.30.

EXAMPLE 4

Diethyl peroxy-t-butyl phosphate

To a mixture of 7.72 g. of 45% KOH (0.062 mole), 9.6 g. ice water, 5.16 g. of 98% t-butyl hydroperoxide (0.056 mole) and 30 ml. of petroleum ether (B.P. 30 to 60° C.), was added, dropwise, with rapid stirring, 8.62 g. (0.05 mole) of diethyl chlorophosphate. The addition was carried out over a 12 minute period. The temperature was maintained at 10 to 15° C. during the addition and the subsequent 18 minute reaction period. The reaction mixture was diluted with 30 ml. of water and thoroughly mixed. The organic phase was separated, thoroughly washed to remove impurities and dried over anhydrous magnesium sulfate. Filtration and removal of the solvent at reduced pressure and room temperature left 8.6 g. (76% yield) of an oil; $n_D^{25}$ 1.4163, $d_4^{25}$ 1.0456.

Calculated for $C_8H_{19}O_5$ P: Act. (O), 7.08. Found: Act. (O), 6.97.

Molecular refraction: Calculated, 53.34; observed, 54.32.

EXAMPLE 5

Di-n-octyl peroxycumyl phosphate

To a mixture of 2.4 g. of 82.2% cumene hydroperoxide (0.011 mole), 1.74 g. (0.022 mole) of pyridine and 30 ml. of petroleum ether (B.P. 30 to 60° C.) was added 3.8 g. (0.011 mole) of dioctyl chlorophosphate. The mixture was prepared at 0° to +5° C. and allowed to gradually come to 25° C. Stirring was continued for 4 hours, the mixture was then diluted with 30 ml. of petroleum ether, filtered to remove pyridine hydrochloride and thoroughly washed (water, saturated tartaric acid, saturated sodium bicarbonate solution) to remove impurities. The organic phase was dried over magnesium sulfate, filtered and the solvent removed under reduced pressure to leave 4.9 g. (76% yield) of a colorless oil.

Calculated for $C_{25}H_{45}O_5P$: Act. (O), 3.51%. Found: Act. (O), 2.36%.

EXAMPLE 6

Di-n-butyl peroxycumyl phosphate

Into a mixture of 4.8 g. of 92% cumene hydroperoxide (0.029 mole), 4.59 g. pyridine (0.058 mole) and 50 ml. of petroleum ether (B.P. 30 to 60° C.) was added, dropwise, with rapid stirring, 6.67 g. (0.029 mole) of di-n-butyl chlorophosphate. The reaction temperature was held at −4 to −5° C. during the 3 minute addition period. Cooling was removed and the temperature rose to 18° C. during the one hour reaction period. The mixture was then filtered to remove pyridine hydrochloride and the organic liquid was diluted with 50 ml. of petroleum ether and thoroughly washed (water, tartaric acid solution, bicarbonate solution) to remove impurities. The organic phase was dried over anhydrous magnesium sulfate, filtered, the solid removed under reduced pressure to leave 9.0 g. (90%) yield of a colorless oil: $n_D^{25}$ 1.4677, $d_4^{25}$ 1.065.

Calculated for $C_{17}H_{29}O_5P$: Act. (O), 4.65%. Found: Act. (O), 3.85%.

Molecular refraction: Calculated, 91.31; observed, 89.64.

EXAMPLE 7

Di-n-octyl peroxypinanyl phosphate

Into a rapidly stirring mixture of 3.78 g. of 90% pinane hydroperoxide (0.02 mole), 3.48 g. (0.044 mole) of pyridine and 40 ml. of petroleum ether (B.P. 30 to 60° C.) was added 6.81 g. (0.02 mole) of di-n-octyl chlorophosphate. The temperature was maintained at 23° C. during the addition and was kept in the range of 23 to 25° C. during the 3 hour stirring period. The reaction mixture was then diluted with an equal volume of petroleum ether, filtered to remove pyridine hydrochloride and thoroughly washed (water, saturated tartaric acid, saturated sodium bicarbonate) to remove impurities. After drying with anhydrous magnesium sulfate the organic phase was filtered and the solvent removed under reduced pressure at room temperature. The product was 9.4 g. of a colorless oil (99% yield): $n_D^{25}$ 1.4593, $d_4^{25}$ 0.9949.

Calculated for $C_{26}H_{51}O_5P$: Act. (O), 3.37%. Found: Act. (O), 2.93%.

Molecular refraction: Calculated, 132.6; observed, 130.5.

EXAMPLE 8

Di-n-butyl peroxyhexyl phosphate

To a cold (−3° C.) mixture of 50 ml. of petroleum ether, 3.9 g. (0.03 mole) of 91% n-hexyl hydroperoxide and 4.75 g. (0.05 mole) of pyridine was added 6.86 g. (0.03 mole) of di-n-butyl chlorophosphate. The addition was carried out over a 3 minute period. The temperature was then allowed to rise to room temperature during the reaction period of 50 minutes. The reaction mixture was filtered to remove pyridine hydrochloride, diluted with 50 ml. of petroleum ether and thoroughly washed (cold water, saturated tartaric acid, saturated sodium bicarbonate) to remove impurities. After drying over anhydrous magnesium sulfate, the solution was filtered and the solvent removed under reduced pressure to yield 8.3 g. (89.3% yield) of an oil: $n_D^{25}$ 1.4264, $d_4^{25}$ 0.9969.

Calculated for $C_{14}H_{31}O_5P$: Act. (O), 5.16%. Found: Act. (O), 3.92%.

Molecular refraction: Calculated, 81.06; observed, 79.85.

EXAMPLE 9

Di-phenyl peroxy-t-butyl phosphate

To a mixture of 5.2 g. (0.056 mole) of 98% t-butyl hydroperoxide and 17 g. of 20% potassium hydroxide was added 13.4 g. (0.05 mole) of diphenylchlorophosphate. The temperature was controlled at 10° C. during the 7 minute addition period and held at 20° C. during the subsequent 1 hour reaction period. The mixture was then diluted with 25 ml. of cold water and the organic material extracted with 15 ml. of diethyl ether. After the ethereal solution was washed twice with cold water, it was dried over anhydrous magnesium sulfate. Filtration and removal of the solvent under reduced pressure left 13 g. (80% yield) of an oil: $n_D^{25}$ 1.4996.

Calculated for $C_{16}H_{19}O_5P$: Act. (O), 4.97%. Found: Act. (O), 2.63%.

EXAMPLE 10

Diphenyl peroxycumyl phosphate

To a mixture of 12.1 g. (0.056 mole) of 75% cumene hydroperoxide and 17 g. of 20% potassium hydroxide was added 13.4 g. (0.05 mole) of diphenylchlorophosphate. The temperature was controlled at 10° C. during the 7 minute addition period and held at 20° C. during the subsequent 1 hour reaction period. The mixture was then diluted with 25 ml. of cold water and the organic material extracted with 15 ml. of diethyl ether. After the ethereal solution was washed twice with cold water, it was dried over anhydrous magnesium sulfate. Filtration and removal of the solvent under reduced pressure left 15 g. (78% yield) of an oil: $n_D^{25}$ 1.5182.

Calculated for $C_{21}H_{21}O_5P$: Act. (O), 4.17%. Found: Act. (O), 3.66%.

EXAMPLE 11

*2,5-dimethylhexane-2,5-diperoxy-(diphenyl)-phosphate*

To a solution of 8.9 g. (0.05 mole) of 99% 2,5-dimethylhexane-2,5-dihydroperoxide in 100 ml. of diethyl ether and 7.9 g. of pyridine, was added 26.8 g. (0.1 mole) of diphenylchlorophosphate. The temperature was maintained at 30° C. during the 4 hour reaction period. The reaction mixture was then diluted with 50 ml. of diethyl ether, filtered to remove pyridine hydrochloride and thoroughly washed (water, tartaric acid, saturated sodium bicarbonate) to remove impurities. The organic phase was dried over anhydrous magnesium sulfate, filtered and the solvent evaporated under reduced pressure to yield 26 g. (81% yield) of viscous oil: $n_D^{28}$ 1.5233, $d_4^{28}$ 1.197.

Calculated for $C_{32}H_{36}O_{10}P_2$.

Molecular refraction: Calculated, 163.26; observed, 163.91.

EXAMPLE 12

*2,5-dimethylhexane-2,5-diperoxy-(di-n-butyl) phosphate*

To a mixture of 9 g. (0.05 mole) of 2,5-dimethylhexane-2,5-dihydroperoxide, 50 ml. of anhydrous ethyl ether and 16 g. (0.2 mole) of pyridine was added 22.9 g. (0.1 mole) of dibutyl chlorophosphate. The mixture was stirred for a period of 3 hours at room temperature. After filtration to remove solid pyridine hydrochloride, the product was thoroughly washed, dried over anhydrous magnesium sulfate, filtered, and the solvent removed under reduced pressure to leave a colorless oil: $n_D^{24}$ 1.4320, $d_4^{24}$ 1.0607.

Calculated for $C_{24}H_{52}O_{10}P_2$.

Molecular refraction: Calculated, 141.42; observed, 138.0.

The novel peroxy phosphate esters of the instant invention as described and specifically illustrated above have a variety of uses. By reason of the presence of the peroxy group they may be employed as initiators of polymerization for many types of plastic, as for instance in the polymerization of vinyl compounds, polyesters, polyethylenes and silicone gums.

The products, probably by reason of the phosphate group, possess interesting characteristics as germicides, fungicides, insecticides and miticides. They also may be used as bleaching agents, as for instance in foodstuffs, such as flour and other edible materials.

What is claimed is:

1. Peroxy phosphate esters of the constitution

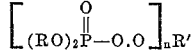

where R and R' are each an organic radical selected from the group consisting of alkyl straight chain radicals, alkyl branched chain radicals, cycloalkyl radicals having less than three rings, and monophenyl aralkyl radicals, and $n$ is an integer less than 3.

2. An ester in accordance with claim 1 wherein R' is the tertiary butyl radical.

3. An ester in accordance with claim 1 wherein R' is the pinanyl radical.

4. An ester in accordance with claim 1 wherein R' is the cumenyl radical.

5. An ester in accordance with claim 1 wherein R' is the n-hexyl radical.

6. An ester in accordance with claim 1 wherein R' is the 2.5 dimethylhexanyl radical.

7. An ester in accordance with claim 1 wherein R' is the tertiary butyl radical and R is the ethyl radical.

8. An ester in accordance with claim 1 wherein R' is the tertiary butyl radical and R is the octyl radical.

9. An ester in accordance with claim 1 wherein R' is the tertiary butyl radical and R is the phenyl radical.

10. An ester in accordance with claim 1 wherein R' is the pinanyl radical and R is the n-butyl radical.

11. An ester in accordance with claim 1 wherein R' is the pinanyl radical and R is the n-octyl radical.

12. An ester in accordance with claim 1 wherein R' is the cumenyl radical and R is the n-butyl radical.

13. An ester in accordance with claim 1 wherein R' is the cumenyl radical and R is the n-octyl radical.

14. An ester in accordance with claim 1 wherein R' is the cumenyl radical and R is the phenyl radical.

15. An ester in accordance with claim 1 wherein R' is the n-hexyl radical and R is the n-butyl radical.

16. An ester in accordance with claim 1 wherein R' is the 2.5 dimethylhexanyl radical and R is the n-butyl radical.

17. An ester in accordance with claim 1 wherein R' is the 2.5 dimethylhexanyl radical and R is the phenyl radical.

References Cited in the file of this patent

UNITED STATES PATENTS 2,828,241    Birum _____ Mar. 25, 1958

UNITED STATES PATENT OFFICE
CERTIFICATE OF CORRECTION

Patent No. 2,960,526            November 15, 1960

James B. Harrison et al.

It is hereby certified that error appears in the printed specification of the above numbered patent requiring correction and that the said Letters Patent should read as corrected below.

Column 2, line 19, after "prepared" insert -- from --.

Signed and sealed this 25th day of April 1961.

(SEAL)
Attest:
ERNEST W. SWIDER
Attesting Officer

DAVID L. LADD
Commissioner of Patents